Aug. 26, 1941.  W. B. TUCKER ET AL  2,253,874
FILM COUPLING
Filed April 4, 1940
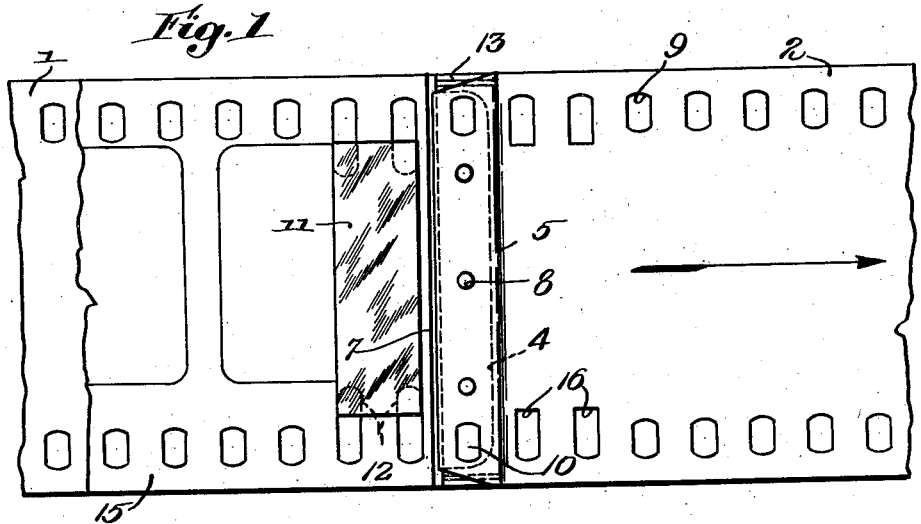
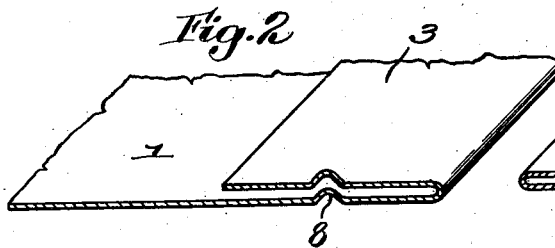
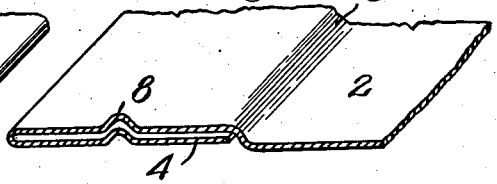
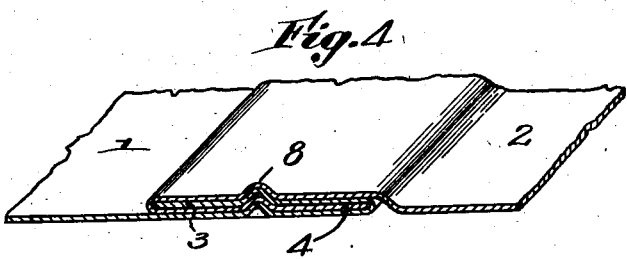
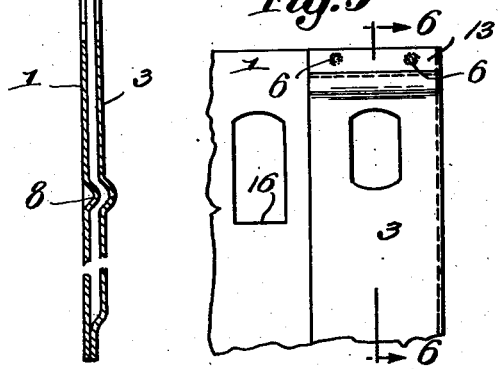
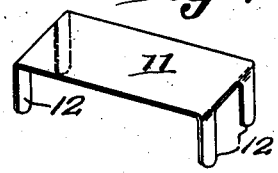
Inventors.
William B. Tucker
Frank W. Taylor Patented Aug. 26, 1941

2,253,874

UNITED STATES PATENT OFFICE 2,253,874

FILM COUPLING

William B. Tucker, Hollywood, and Frank W. Taylor, Los Angeles, Calif., assignors to Technicolor Motion Picture Corporation, Los Angeles, (Hollywood), Calif., a corporation of Maine Application April 4, 1940, Serial No. 327,832

3 Claims. (Cl. 88—19.5)

This invention relates to a coupling for interconnecting two strips of motion picture film for the purpose of successively feeding the strips through a cinematographic machine such as a multi-stage developing machine, objects of the invention being to provide a device which may be coupled and uncoupled quickly and easily, which does not become uncoupled accidentally, which is strong and durable yet thin and flexible, which will run over sprocket wheels and through confined spaces in film-gates and the like, which may easily be joined to the ends of the films which are to be coupled together and which is generally superior to prior devices for the same general purposes.

According to this invention the film coupling comprises two ribbons of resilient sheet material, such as brass, steel, other metallic alloy or a plastic, about the same width and thickness as motion picture film, the ribbons having their ends folded back to form hooks adapted to interengage with each other, and the coupling has sprocket holes including holes in the aforesaid hooks which register with each other when the hooks are interengaged in operative relationship. Said material is form-retaining so that the hooks do not straighten out when subjected to the tension to which films are normally subjected and one hook may have a protuberance adapted to snap into a recess in the other hook by virtue of the resilience of the sheet material. Preferably the edges of one hook are secured together, as by welding, to form a pocket, and the other hook is narrow enough to fit into the pocket. This construction resists the tendency of the parts to straighten when subjected to tension since the hook can not straighten unless the pocket is torn open.

For the purpose of illustrating the genus of the invention a typical embodiment is shown in the accompanying drawing in which Fig. 1 is a side view of the coupling with a film connected to the left-hand part of the coupling;

Fig. 2 is a perspective view of the left-hand part of the coupling with a portion broken away and a portion in longitudinal section;

Fig. 3 is a similar view of the right-hand part of the coupling;

Fig. 4 is a similar view of the two parts of the coupling interengaged with each other;

Fig. 5 is a view similar to Fig. 1 showing a portion of the left-hand part of the coupling;

Fig. 6 is a section on line 6—6 of Fig. 5; and

Fig. 7 is a perspective view of one of the various means which may be used to connect each part of the coupling with a film.

The particular embodiment of the invention chosen for the purpose of illustration comprises two pieces 1 and 2 of steel ribbon having their ends folded back upon themselves to form hooks 3 and 4 adapted to interengage in the manner shown in Figs. 1 and 4. As shown in Figs. 3 and 4 the part 2 may be offset as indicated at 5 so that when the two parts are hooked together the parts lie in the same plane. As shown in Figs. 1, 5 and 6 the lateral margins 13 of the hook 3 are preferably bent down into contact with the edges of the part 1 and secured thereto by spot welding as indicated at 6 in Fig. 5, thereby forming a pocket which is closed on three sides to receive the hook 4. Inasmuch as the inside width of this pocket is somewhat less than the width of the ribbons 1 and 2, the hook 4 is made somewhat narrower than the width of the ribbon in order to fit into the pocket. As shown in Fig. 1 this is accomplished by making the edges of the ribbon 2 converge from the shoulder 5 to the folded edge 7 of the part 2. In order to restrain accidental disengagement of the coupling the folded portions are provided with interengaging indentations 8 which snap into each other due to the resilience of the parts as indicated in Fig. 4. To permit the coupling to seat over sprocket wheels of motion picture apparatus the parts 1 and 2 are provided with marginal sprocket holes 9 which are located in the same way as the sprocket holes of the films to which the parts of the coupling are to be connected. The series of sprocket holes include holes 10 in the overlapping portions of the hooks, the holes of each hook registering with those of the other hook when the two parts are interengaged in the manner illustrated in Figs. 1 and 4.

While the parts of the coupling may be connected to the ends of two films in any suitable manner, a typical way involves the use of a metallic clip such as shown at 11 in Figs. 1 and 7. This clip has four legs 12 adapted to extend through openings in the clip and associated film with the legs bent over as shown at 12 in Fig. 1. While the bent-over legs may be located on either side, they are preferably located on the coupling side; thus in Fig. 1 the film 15 is shown on top and the bent legs 12 underneath. When applying the clip 11 to the sprocket holes of the film and coupling the holes to receive the legs of the coupling are enlarged on the inner ends as indicated at 16 in Fig. 1 so that the clip does not extend into the portions of the sprocket holes which receive the teeth of the sprocket over which the coupling feeds.

In Figs. 1 and 5 the enlarged perforations for the legs of the clips are shown adjacent the hooks, but in practice there may be a considerable number (say sixteen) of intervening perforations of normal size.

While the coupling may be connected with two films so as to feed in either direction through motion picture apparatus the parts are preferably connected so that the coupling feeds in the direction of the arrow in Fig. 1, in which case the part 2 comprises the head part of the coupling and 1 comprises the tail part.

The coupling herein described and claimed is superior to prior devices in many ways. It is inexpensive and durable and feeds over sprocket wheels without difficulty. With the parts properly connected to the ends of two films the ends can not be joined together with the films facing in opposite directions, and with the parts properly located lengthwise of the ends the films can not be interconnected out of synchronism. And of course the parts of the coupling may be interengaged with each other and disengaged from each other with exceptional ease. At the same time there is no danger of accidental disengagement.

It should be understood that the present disclosure is for the purpose of illustration only and that this invention includes all modifications and equivalents which fall within the scope of the appended claims.

I claim:

1. A film coupling for detachably interconnecting two strips of cinematographic film or the like comprising two ribbons of thin flexible material, means for attaching the ribbons to the ends of said strips respectively, one of said ribbons having its end folded back with the opposite edges of the folded portion secured together to form a pocket and the other ribbon having its end folded back to form a hook which is adapted to hook into said pocket, said material being form-retaining so that the hook does not pull out of the pocket when the coupling is subjected to considerable tension and the overlapping portions of the hook and pocket having an interfitting lug and socket adapted to snap into and out of interengagement to restrain accidental displacement of the hook from the pocket.

2. A film coupling for detachably interconnecting two strips of cinematographic film or the like comprising two ribbons of thin flexible material, means for attaching the ribbons to the ends of said strips respectively, one of said ribbons having its end folded back with the opposite edges of the folded portion secured together to form a pocket and the other ribbon having its end folded back to form a hook which is adapted to hook into said pocket, said material being form-retaining so that the hook does not pull out of the pocket when the coupling is subjected to considerable tension and the coupling having sprocket holes along at least one margin, including a sprocket hole in the overlapping portions of said hook and pocket.

3. A film coupling for detachably interconnecting two strips of cinematographic film or the like comprising two ribbons of thin flexible material, means for attaching the ribbons to the ends of said strips respectively, one of said ribbons having its end folded back with the opposite edges of the folded portion secured together to form a pocket and the other ribbon having its end folded back to form a hook which is adapted to hook into said pocket, said material being form-retaining so that the hook does not pull out of the pocket when the coupling is subjected to considerable tension and the coupling having sprocket holes along at least one margin, including a sprocket hole in the overlapping portions of said hook and pocket, one of said ribbons being transversely offset so that, when the hook and pocket are interengaged, the two ribbons lie in approximately the same plane.

WILLIAM B. TUCKER.
FRANK W. TAYLOR.